July 23, 1935.  R. S. HOPKINS  2,008,982
DEVICE FOR PRODUCING ENLARGED IMAGES
Filed Feb. 1, 1934  4 Sheets-Sheet 1

Inventor:
Roy S. Hopkins,

By

Attorneys

July 23, 1935.  R. S. HOPKINS  2,008,982
DEVICE FOR PRODUCING ENLARGED IMAGES
Filed Feb. 1, 1934  4 Sheets-Sheet 2

Inventors:
Roy S. Hopkins,

By

Attorneys

July 23, 1935.  R. S. HOPKINS  2,008,982
DEVICE FOR PRODUCING ENLARGED IMAGES
Filed Feb. 1, 1934   4 Sheets-Sheet 3
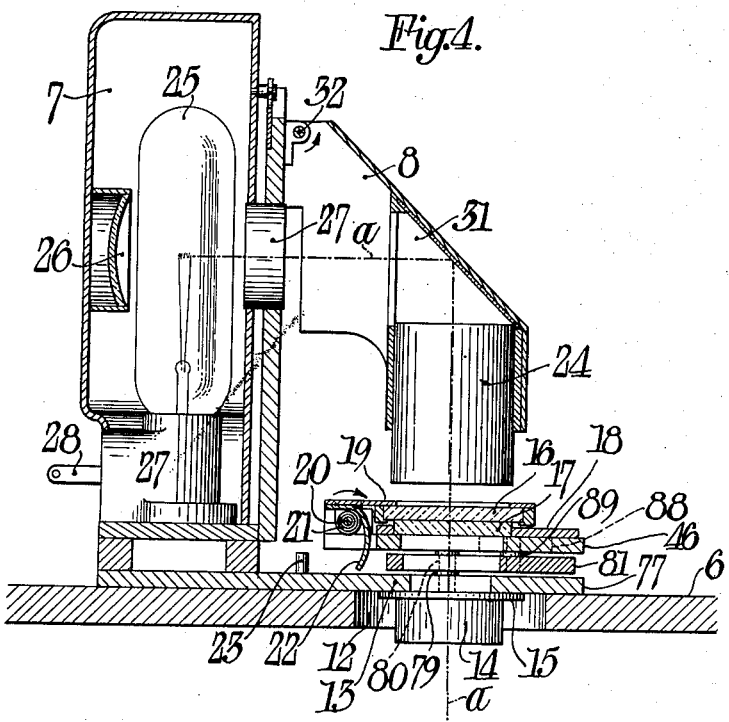
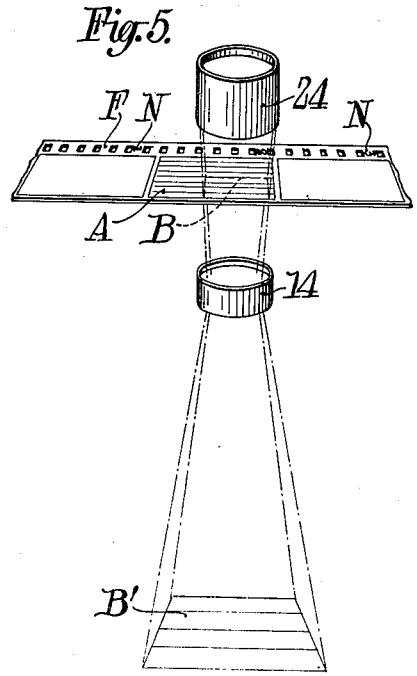
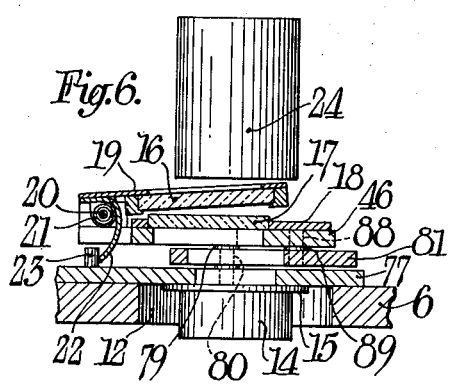
Inventor:
Roy S. Hopkins, July 23, 1935.  R. S. HOPKINS  2,008,982
DEVICE FOR PRODUCING ENLARGED IMAGES
Filed Feb. 1, 1934  4 Sheets-Sheet 4
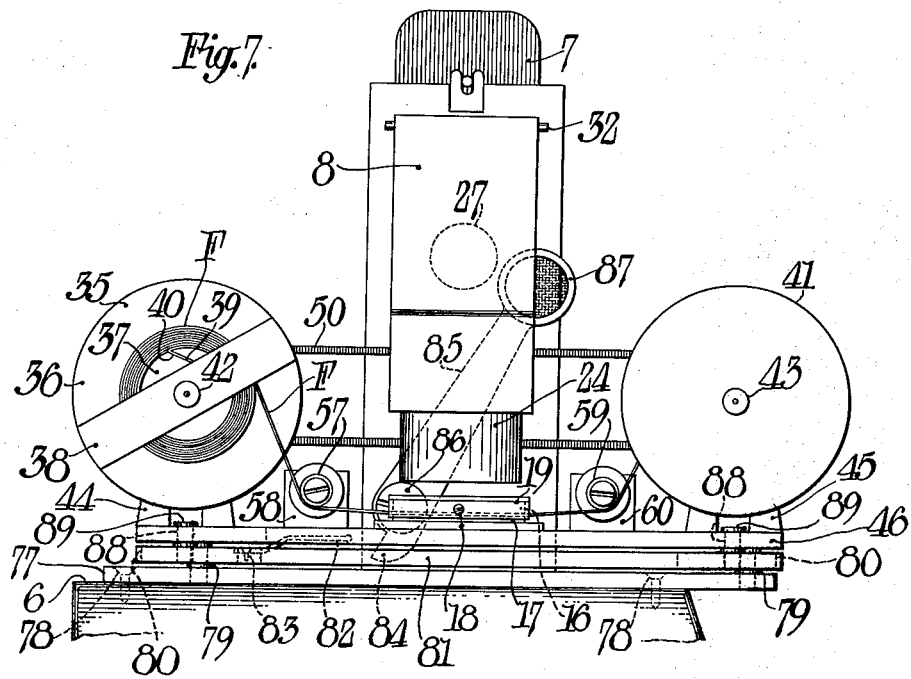
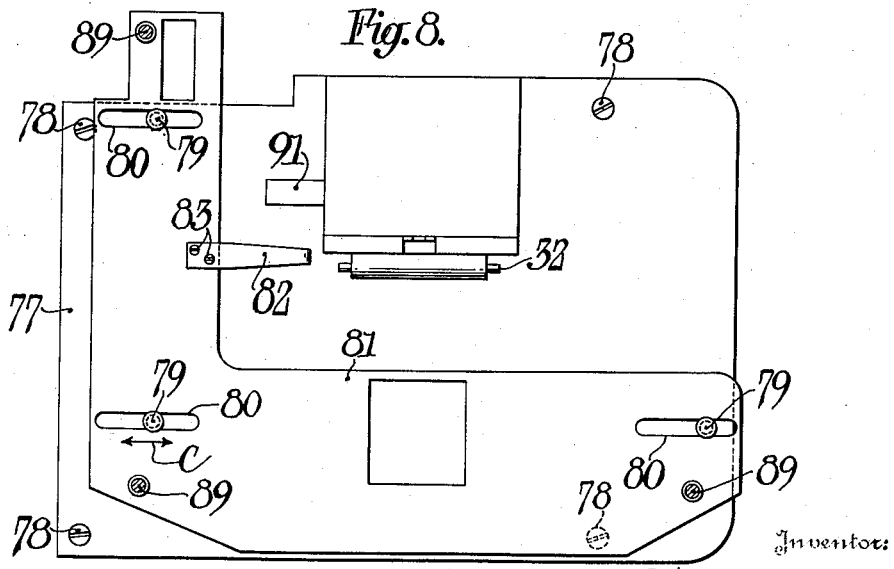
Inventor:
Roy S. Hopkins,
By
Attorneys Patented July 23, 1935

2,008,982

UNITED STATES PATENT OFFICE 2,008,982

DEVICE FOR PRODUCING ENLARGED IMAGES

Roy S. Hopkins, Rochester, N. Y., assignor to Eastman Kodak Company, Rochester, N. Y., a corporation of New York Application February 1, 1934, Serial No. 709,352

12 Claims. (Cl. 88—24)

REISSUED
JUL 18 1944

This invention relates to a device for producing enlarged images carried by a film on a viewing screen. One object of my invention is to provide a device in which a part of an image carried by a film may be projected on a viewing screen. Another object of my invention is to provide a device of the class described in which various parts of an image carried by a film can be moved into alignment with an optical system so that such parts may be enlarged and viewed on a viewing screen. Another object of my invention is to provide a device with a controlling handle by which different areas of an image-bearing negative can be projected upon a viewing screen. Another object of my invention is to provide a device particularly adapted for use in reading minute images of printed matter taken on film. Another object of my invention is to provide a device for rapidly changing films carrying images adapted to be projected upon a viewing screen. Still another object of my invention is to provide an inter-locking mechanism arranged to hold a film flat for viewing various areas thereof and to release the film-holding means so that different areas of film may be moved into position. Still another object of my invention is to provide a reading machine in which the inter-locking mechanism is arranged to prevent movement of the film while it is clamped in a flat position and to permit movement of the film when the film clamping means is released and other objects will appear from the following specification, the novel features being particularly pointed out in the claims at the end thereof.

Coming now to the drawings wherein like characters denote like parts throughout:

Fig. 4 is a section through the optical system and negative holding mechanism used with the projecting machine shown in Fig. 2;

Fig. 5 is a diagrammatic view illustrating a portion of the optical system and illustrating a portion of a negative enlarged for viewing;

Fig. 6 is a fragmentary detail section through the film holding mechanism with the parts in position to permit a film to be freely wound through the film holder;

Fig. 7 is a front elevation showing the film holding and film moving structure of the machine shown in Fig. 1;

Fig. 8 is a top plan view but with portions of the machine removed to illustrate the lower-most plate which forms a portion of the carriage carrying the film moving mechanism;

Fig. 9 is a detail view showing a part of the inter-locking mechanism between the film frame moving mechanism and the film reeling mechanism.

My present invention was designed primarily for enlarging small areas of printed matter reduced to extremely minute size on photographic film. The machine was particularly designed for enlarging areas of a motion picture film to a sufficient size to read readily. In order to give some idea of the proportion of enlargement, a film area A, (Fig. 5) which may be roughly twice the size of a normal 35 mm. motion picture film frame enlarged by omitting one row of perforations, is adapted to receive an image of a standard size newspaper sheet. If such an area is enlarged to a sufficient size to read, that is, somewhat larger than the type of the usual newspaper the machine will have to be a very large size and consequently it would be inconvenient.

I have, therefore, provided a machine which will enlarge an area shown as B which may conveniently be approximately one-quarter of the full size of the image.

My invention is particularly directed to providing a means for rapidly moving the film past its position in which it is projected upon a screen and for moving a single area about through the light beam so that a desired area will be projected upon a viewing screen enlarged sufficiently to make the type easy to read.

Figure 1:
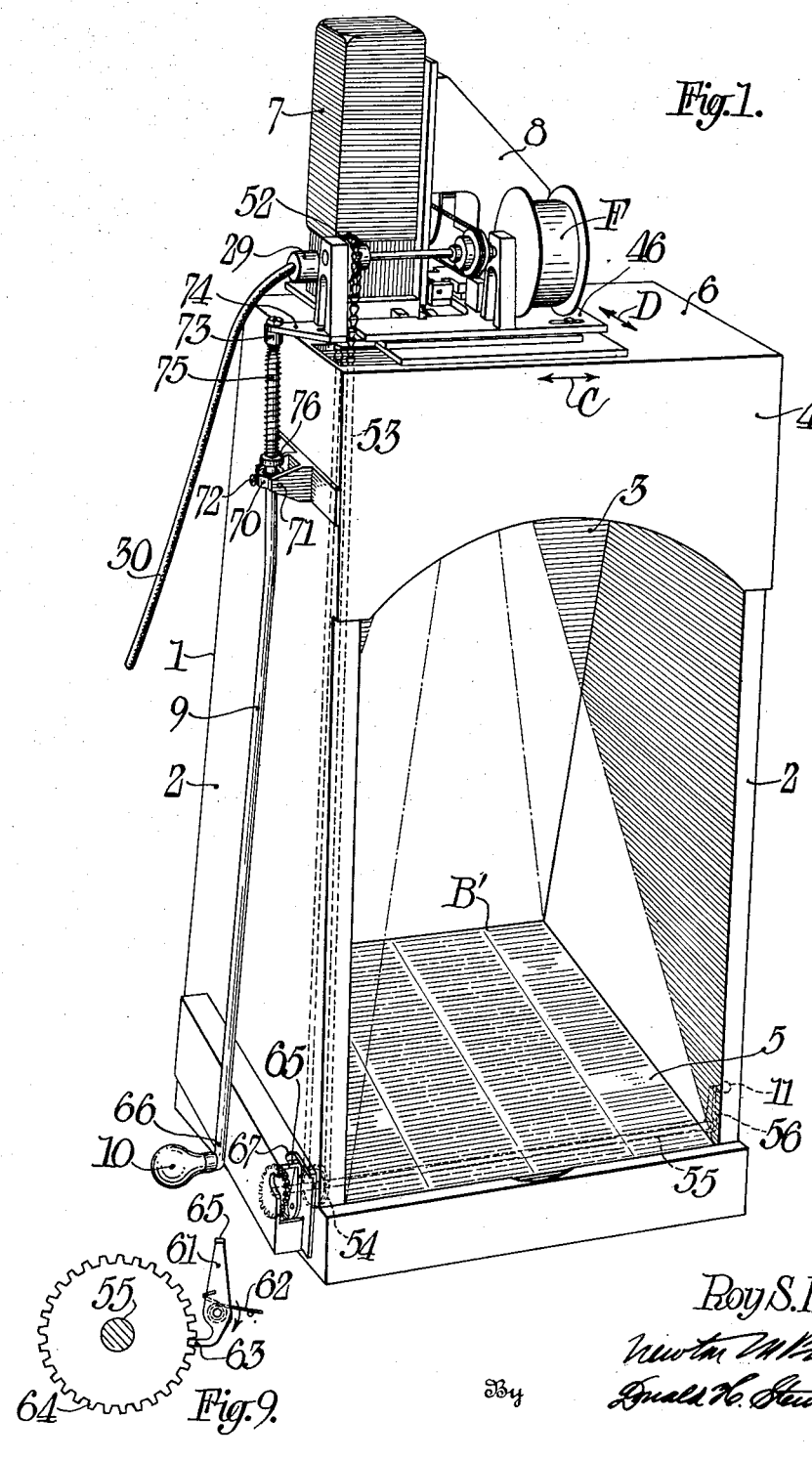
Fig. 1 is a perspective view of a device constructed in accordance with and embodying a preferred form of my invention.

Referring to Fig. 1 a preferred embodiment of my machine may consist of a cabinet designated broadly as 1, this cabinet preferably including side walls 2, a rear wall 3, a part of a front wall 4 and a slanting bottom wall 5 which forms a reading screen. There is a top 6 on the cabinet which carries the film F, a lamp house 7, and a housing 8 enclosing part of the optical system.

A side wall 2 carries a lever arm 9 with a handle 10 arranged near the reading screen 5 and by the operation of this handle that area of film which it is desired to project upon the reading screen 5 can be easily selected from a single frame of film and the particular frame of film can be readily obtained by turning the handle 11.

An inter-locking mechanism is provided which will prevent injuring the film by failure to operate the proper parts at the proper time as will be hereinafter more fully described.

The optical system which may be used in accordance with my invention is illustrated in Fig. 4. In this figure the top of the machine 6 is provided with an opening 12 which may be partially covered by a plate 13. An objective is mounted in the lens barrel 14, the flange of which 15, is attached to the plate 13. The axis, a, of the objective passes through a film carrier which is here shown as a pair of glass plates 16 and 17, the latter being carried in a metallic frame 18 and the former being carried in a frame 19 hingedly mounted at 20 to the frame 18. Spring 21 normally turns frame 19 towards frame 18 into a clamping position and frame 19 is provided with a tongue 22 which extends downwardly so that when the film carrier as a whole is moved in a manner which will be hereinafter fully described the tongue 22 may be made to engage the pin 23 carried by plate 13 and thus swing the upper section 16 of the film holder away from the lower section to leave a free space therebetween. This position is indicated in Fig. 6. This is the winding position, that is, the position in which the film may be wound through the film holder for changing the areas of film which are to be projected.

On the axis, a, of the objective 14 there is arranged a condenser 24 which causes the light rays from the lamp 25 to pass properly through the film and the objective 14. I have also found it useful to increase the useful light rays by means of a reflector 26 and a condenser 27. Since the optics of the condensers and the reflector may be of any well known or suitable type, these will not be discussed further.

The lamp 25 is carried by a base 27 with the usual terminals 28 which may fit into a suitable socket 29 attached to a cord 30 as indicated in Fig. 1.

The axis, a, of the objective 14 may be bent at right angles by means of a prism or other suitable reflector 31 and I prefer to mount the housing 8 on a hinged pintle 32 so that this housing may be swung in the direction shown by the arrow in Fig. 4 to conveniently clean the prism and the surface of the condenser lenses.

As indicated in Figs. 5 and 1 the optical system is adapted to enlarge an area B from a large area A on the film F, this image being brought to a focus upon a viewing screen 5. The viewing screen 5 may be a plane surface preferably painted white or bluish white so that an image can be readily seen thereon.

In order to wind various films to and from the film holder rapidly and without damaging the film I prefer to use the mechanism shown in Figs. 7 and 1. The film F is preferably carried upon a reel designated broadly as 35 which may consist of a single flange 36, a hub 37 and a second flange 38 which may consist of a narrow strip extending across the end of the hub 37. This construction is useful for the supply reel since it permits the end 39 of the film F to be readily manipulated and placed in the slot 40 which holds the end of the film to the hub.

A second film reel 41 is provided and this film reel may be of a well known type employing the usual two circular flanges with a hub similar to the hub 37 between the flanges.

Figure 2:
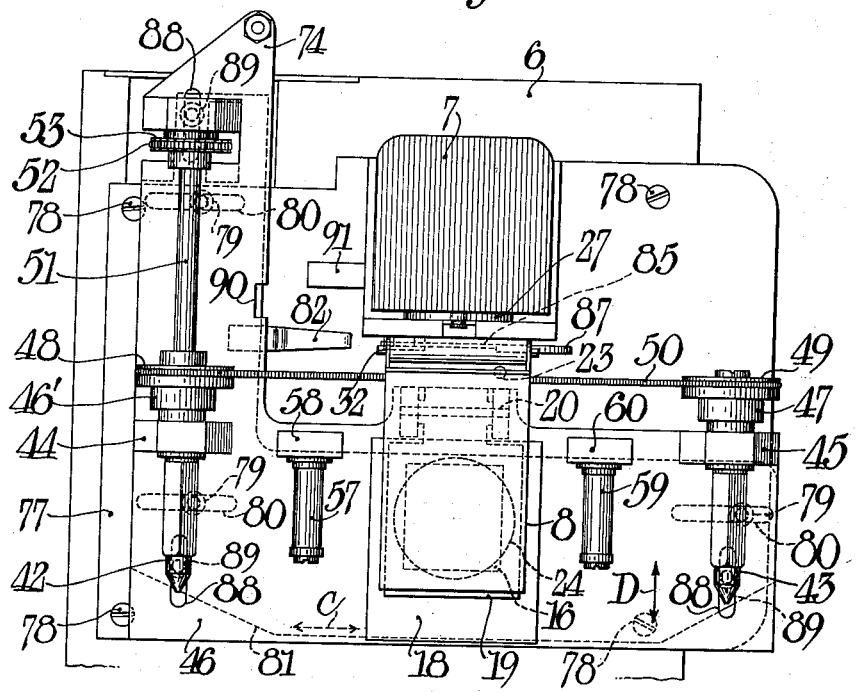
Fig. 2 is a top plan view of the device shown in Fig. 1.
Figure 3:
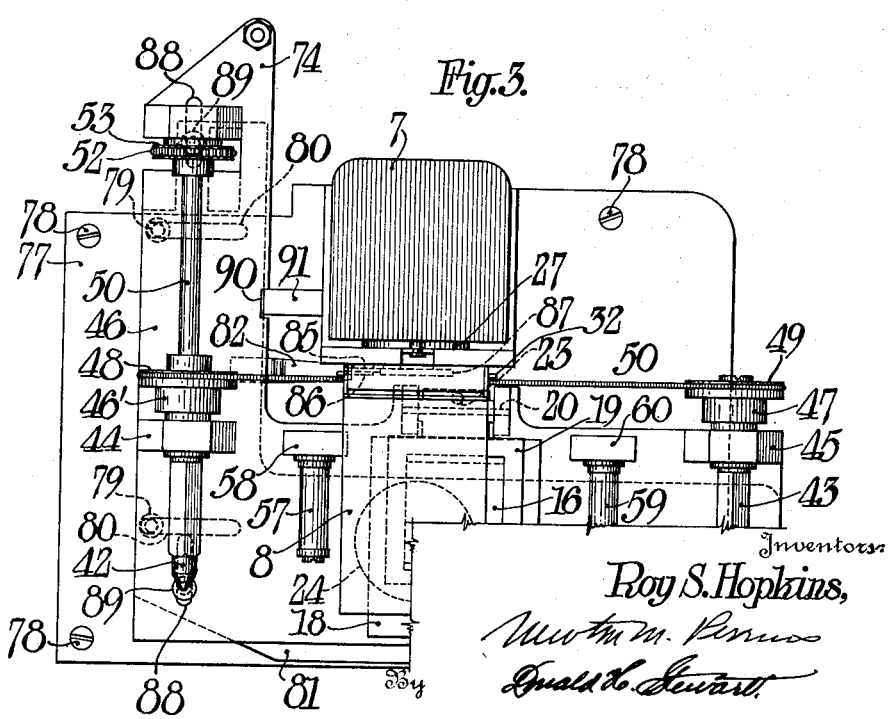
Fig. 3 is a view similar to Fig. 2 but with parts of the cabinet omitted and with parts of the mechanism in a different position from that shown in Fig. 2.

Referring now to Fig. 2 the reels 35 and 41 may be mounted upon two shafts 42 and 43, each of these shafts being supported by a pair of upright brackets 44 and 45, both of which are carried by a plate 46.

Each of the shafts 42 and 43 may be provided with slip clutches 46 and 47 and there is a pulley 48 on the shaft 42 and a similar pulley 49 on shaft 43, the two pulleys being connected by a belt 50.

A shaft 51 extends to the slip clutch 46 and carries a sprocket 52 on which a chain 53 is mounted, this chain, as best shown in Fig. 1, passing downwardly inside of the casing to a second sprocket 54 carried by a shaft 55 terminating at one end in a lever 56 to which an operating handle 11 is attached.

By turning the handle 11 it is obvious that the shafts 42 and 43 will be turned and film carried by reels 35 and 41 will turn, moving the film from one reel to the other.

The film F passing from reel 35 (Fig. 7) passes over a suitable guide roll 57 carried by a support 58 through the film holding members in the frames 18 and 19 and over a second guide roll 59 mounted on the bracket 60 and thence to the reel 41. The brackets 58 and 60 are carried by plate 46.

From Fig. 9 it will be noted that there is an inter-locking connection between the shaft 55 and the lever 9 which may be operated by the handle 10. This inter-locking connection consists in a dog 61 pressed by a spring 62 in the direction shown by the arrow so that the pawl 63 will be brought into engagement with the teeth 64 of a ratchet wheel carried by the shaft 55. The dog 61 has a tail 65 which may be engaged by the end 66 of lever 9 when this lever is moved to engage in the notch 67. When part 66 moves in the notch 67 the dog 64 will be moved against the pressure of spring 62 so that the pawl 63 may release the ratchet 64 and the handle 11 can be freely turned at all other times, that is, when the handle 10 is moved to free the lever 9 from the notch 67, the handle 11 is locked against movement.

The reason for this is as follows: Before the film can be moved it is necessary to open up the film holders 16 and 17 and consequently these parts must be moved to the position shown in Fig. 6. At all other times the film will be held flat between the plates 16 and 17 and if an attempt is made to move the film it would be damaged, if the interlocking device was omitted.

The parts are so arranged that when the handle 10 engages part 66 of the lever 9 in the slot 67 that the arm 22 will engage the post 23 and will release the film.

The means of accomplishing this result will now be described. Handle 10 is connected to a lever 9 which is mounted on the side 2 of the cabinet by means of a universal joint 70, that is, the lever may move about a pivot 71 to move the film carriages crosswise of the cabinet as indicated by the arrow C (Fig. 1) or the lever 9 may be moved about the pivotal connection 72 to move the holder back and forth as indicated by the arrow D. The upper end of the lever is connected by a known type of ball and socket joint at 73 to an end 74 of the movable plate 46. It will be remembered that plate 46 carries the brackets 44 and 45 supporting the film reels and carries also the film holding frames 18 and 19 and the guide rollers 57 and 59.

I provide a spring 75 between an adjustable nut 76 and the ball and socket joint 73 since this spring will take up lost motion and will tend to hold the lever 9 in any set position.

The movable film holding carriage will now be described.

Referring to Fig. 8 the film carriage by which sections of a film area may be arranged in position for projection, is built up of three plates, the first plate 77 being attached by screws 78 to the cabinet top 6 as best shown in Fig. 7. Plate 77 carries a series of upwardly extending studs 79 which pass through slots 80 in a second plate 81 so that plate 81 may slide back and forth in the direction shown by the arrows C.

Plate 81 carries an arm 82 attached by screws 83, this arm being adapted to engage the end 84 of a lever 85 pivoted at 86 to the lamp house 7 and carrying a heat screen 87 of suitable type such as wire mesh or gold plated mica.

When the handle 10 engages in slot 67 and the parts are positioned for winding film through the film holders 16 and 17 arm 82 will engage part 84 and the heat screen 87 will intercept the light path. When, however, the carriage 81 is moved to the position shown in Fig. 7 the heat screen of its own weight will move from its operative position.

The third plate 46 is, like plate 81, mounted to slide but the plate 46 slides in an opposite direction, that is, in the direction shown by the arrows D in Fig. 2. Plate 46 is provided with a plurality of slots 88 which engage the headed studs 89 carried by plate 81. Thus plate 46 can slide forwardly and backwardly upon plate 81 and since plate 81 can slide laterally of the cabinet a universal movement of the film holders 18 and 19 is provided, this movement being readily accomplished by moving the handle 2 which is, as was above described, directly connected to an extension 74 of the plate 46. In order to adjust any part of an exposure area as, for instance, area B of a film F as indicated in Fig. 5 the handle 10 can be swung in the required direction.

In order to make sure that the film holding carriages are positioned for winding film I provide a safeguard in the form of a notch 90 carried by the plate 46, this notch being positioned to engage an arm 91 when the film holders 16 and 17 are opened for film winding. As above explained, when in this position the arm 82 of plate 81 has operatively positioned the heat screen. An operator can readily move handle 10 until the notch 90 engages member 91 and since he can easily feel the engagement of these two parts there is no difficulty in rapidly and easily positioning the film carriage for winding film.

It is possible to move the film in its film holder through the light path so that the axis, a, will pass through any portion of an exposure area A. This can be done with great ease by an operator sitting in front of the cabinet with his left hand on the handle 10.

When it is desired to change the film areas by winding the film from one reel to the other the handle 10 is moved to engage part 66 in the notch 67 and the operator may, by turning the handle 11, rapidly wind the film back and forth between the reels 35 and 41 until the desired area is reached.

It should be noted that while the film holding plates 16 and 17 may separate to permit the film to be wound between these plates since the frames 17 and 18 are hinged, the separation of the plates is not great and the film is not so badly out of focus that designating marks such as numeral N (Fig. 5) on the inner edge of the film will not be clearly visible on the projection screen. Consequently, I prefer to provide film with large-sized indexing numerals in the margin, these numerals appearing on the projection screen even though the film is not held flat during the winding operation.

The complete operation of my machine is as follows: The operator selects a desired roll of film mounted on a reel 41 and after placing the machine in position for winding film—that is, placing handle 10 so that part 66 engages and releases the inter-locking dog 61 so that the film gate is open. As in Fig. 6 the reel is placed on a shaft 43 and the film F is passed beneath the guide roller 59 through the film holding plates 16 and 17 beneath the guide roller 57 after which the end 39 is inserted in the slot 40 of the hub 37. The film may then be wound by turning the handle 11.

The operator may turn the film until a designating numeral N indicates the desired film area. He then moves handle 10 from the slot 67 permitting the spring 62 to throw the pawl 63 in engagement with the ratchet 64. This prevents the film from being turned until the handle 10 is again positioned for that purpose. The handle 10 may then be swung in any direction moving the plates 81 and 46 on their respective slideways, thus moving the film holders 16 and 17 relative to the axis, a, of the optical system until the desired area of film is focused on the focusing screen 5. He may then read or otherwise examine the enlarged image indicated at B'.

As often as different areas of film are to be examined the handle may be moved and when it is desired to move different film frames into place the handle 11 may be employed after first, of course, locking parts 66 and 67 together. Each time the film holders 16 and 17 are separated for winding film from one reel to the other the heat screen 87 is automatically positioned.

While I have described my invention as particularly directed to the visual examination of an enlarged image from small portions of a negative area, it is quite obvious that this machine may also be used for other purposes such as making enlargements on paper and I contemplate as within the scope of my invention all such forms as may come within the terms of the following claims.

What I claim is:

1. In a device for reading enlarged images, the combination with a source of light, of an optical system including an objective, a film holder and a screen, said objective being adapted to produce an image carried by the film on the screen, and a carriage for said film holder mounted to move said holder both laterally and transversely with respect to the optical system for enlarging selected areas of a negative upon the screen and a manually operable lever connected to the film holder carriage, a pivotal mount for said lever, a handle connected to the lever by which the position of the carriage relative to the optical system may be adjusted at will.

2. In a device for reading enlarged images, the combination with a source of light, of an optical system including an objective, a film holder and a screen, said objective being adapted to produce an image carried by the film upon the screen, a carriage for said film holder mounted to move the film holder both transversely and longitudinally with respect to the optical system for enlarging selected areas of a negative upon the screen, and a manually operable lever connected to the film holder carriage, a mount for said pivotally mounted lever, a handle carried by the lever for adjusting the position of the carriage transversely or laterally with respect to the optical system, said handle being located adjacent to said screen whereby an operator viewing the image on the screen may move the handle to transmit motion to the film holder.

3. In a device for reading enlarged images, the combination with a source of light, of an optical system including an objective, a film holder and a screen, said objective being adapted to produce an image carried by the film on the screen, a carriage for said film holder comprising plates mounted to slide relative to each other and in parallel planes and in different directions, said film holder being mounted on one of said plates, the other of said plates supporting the film holder supporting plate, and means for moving said film holder including a lever connected to the plate carrying the film holder.

4. In a device for reading enlarged images, the combination with a source of light of an optical system including an objective, a film holder and a screen, said objective being adapted to produce an image carried by the film on the screen, a carriage for said film holder comprising plates mounted to slide relative to each other in parallel planes and in different directions, said film holder being mounted on one of said plates, the other of said plates supporting the film holder supporting plate, and means for moving said film holder including a lever connected to the plate carrying the film holder, said lever terminating in a handle adjacent said screen.

5. In a device for reading enlarged images, the combination with a source of light, of an optical system including an objective, a film holder and a screen, said objective being adapted to produce an image carried by the film on the screen, a carriage for said film holder comprising a plate mounted to slide in one direction with respect to the optical system, a second plate mounted to move in another direction on the first plate, both plates being movable in parallel planes normal with respect to the optical system, said film holder being mounted on said second plate for moving the film holder, a connection between the second plate and said means by which the former may be moved by the latter.

6. In a device for reading enlarged images, the combination with a source of light, of an optical system including an objective, a film holder and a screen, said objective being adapted to produce an image carried by the film on the screen, a carriage for said film holder comprising two plates mounted to move in parallel planes normal to the optical system, a mount on which each plate is adapted to move, the second plate mount being carried by the first plate, said film holder being supported by the second plate, a handle, a lever to which the handle is connected, said lever being also connected to the second plate and adapted to move an area of film carried by the film holder into a plurality of positions relative to the optical system to project a selected portion of the image on the film to said screen.

7. In a device for reading enlarged images, the combination with a cabinet including a top, an open side and a screen, of a light source and optical system mounted on the top of the cabinet, a movable film holder, a pair of film reels and supports movable with the film holder, means movable to different positions for winding film between the film reels, means to move the movable film holder, and an interlocking device adapted to release the film winding mechanism only when the film moving mechanism is in a predetermined position.

8. In a device for reading enlarged images, the combination with a cabinet including a top, bottom, side and rear walls, said bottom wall forming an image screen, projection apparatus carried by the top of the cabinet including film winding and film moving apparatus, and handles near the bottom of the cabinet and operably connected to the film winding and film moving apparatus at the top of the cabinet for controlling the movement of the apparatus from near the screen.

9. In a device for reading enlarged images, the combination with a cabinet including a top, bottom, side and rear walls, said bottom wall forming an image screen, projection apparatus carried by the top of the cabinet including film winding and film moving apparatus, and handles near the bottom of the cabinet, each having operative and inoperative positions and operably connected to the film winding and film moving apparatus at the top of the cabinet, and an interlocking device adapted to render one handle inoperative at a time.

10. In a device for reading enlarged images the combination with a source of light, an optical system including an objective, a movable carriage, film winding mechanism including film reels, and a film holder including an operable gate, said film winding mechanism and said film holder being mounted together on said carriage, means including a handle for moving the film winding device, and means controlled by the location of the carriage for rendering the handle inoperative.

11. In a device for reading enlarged images the combination with a source of light, an optical system including an objective, a movable carriage, film winding mechanism including film reels, and a film holder including an operable gate, said film winding mechanism and said film holder being mounted together on said carriage, means including a handle for moving the film winding device, means including a second handle for moving the carriage, a lock for the first handle, and means for moving the second handle to a position in which it may unlock the lock releasing the first handle.

12. In a device for reading enlarged images the combination with a source of light, an optical system including an objective, a movable carriage, film winding mechanism including film reels, and a film holder comprising an operable gate, said film winding mechanism and operable gate being mounted together on the movable carriage, means controlled by the position of the carriage for automatically opening said openable gate, a handle for moving the carriage, and a handle for winding film, an interlocking device between the two handles adapted to render only one handle operative at a time, said interlocking device being releasable through moving the carriage handle into engagement therewith, said carriage being positioned by said handle to open the film gate when said film winding handle is released from the interlocking device.

ROY S. HOPKINS.